United States Patent [19]
Nedwek

[11] Patent Number: 5,355,504
[45] Date of Patent: Oct. 11, 1994

[54] SELF-SYNCHRONIZING DATA QUEUES

[75] Inventor: David J. Nedwek, Beaverton, Oreg.

[73] Assignee: Intel Corporation, Santa Clara, Calif.

[21] Appl. No.: 794,467

[22] Filed: Nov. 19, 1991

[51] Int. Cl.$^5$ .............................................. G06F 15/00
[52] U.S. Cl. .................................. 395/775; 395/200; 364/413.13
[58] Field of Search ............................ 395/200, 795; 364/413.13

[56] References Cited

U.S. PATENT DOCUMENTS 4,984,157 1/1991 Cline et al. ..................... 364/413.13
5,168,570 12/1992 Eckert et al. ........................ 395/725

*Primary Examiner*—David C. Cain
*Attorney, Agent, or Firm*—Blakely, Sokoloff, Taylor & Zafman

[57] ABSTRACT

A system for enabling processor cells in a high speed multi-processor environment to communicate with each other so as to resolve synchronization problems caused by propagation and other delays inherent in such an environment. The invention is for systems for which the data delay is both bounded and fixed wherein the maximum data delay is part of the system specifications and all cells operate at the same frequency. Data is transmitted along with a clock to allow the receiving cell to properly recover the data regardless of the state of the receiver's internal clocks. Both the transmitting cell and the receiving cell are operating at the same frequency (because their clock signals are derived from the same master oscillator), but the range of delays associated with the transmission of data places no bounds on the allowable phase difference between the received data's clock and the receiver's internal clock state.

14 Claims, 6 Drawing Sheets

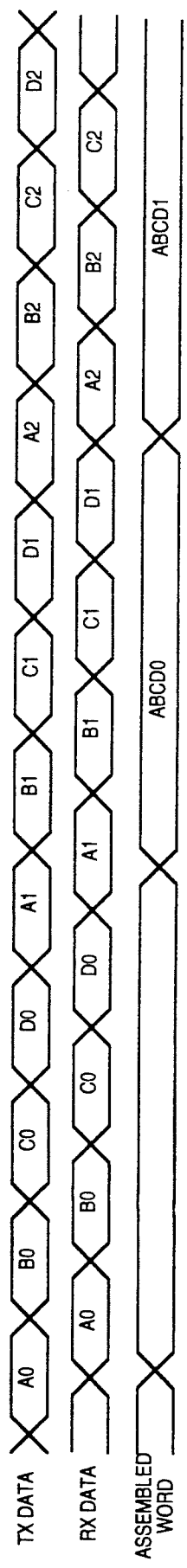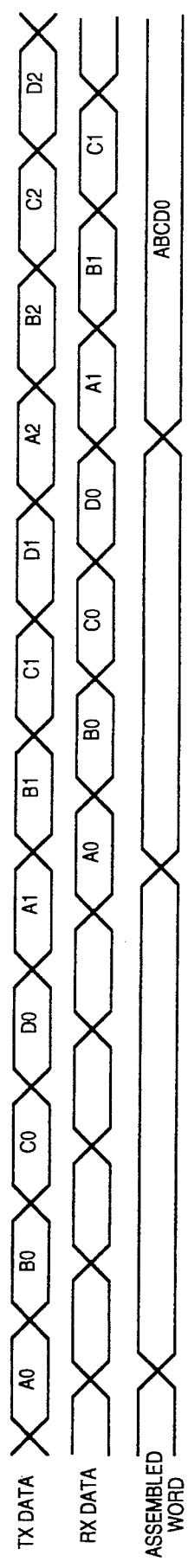

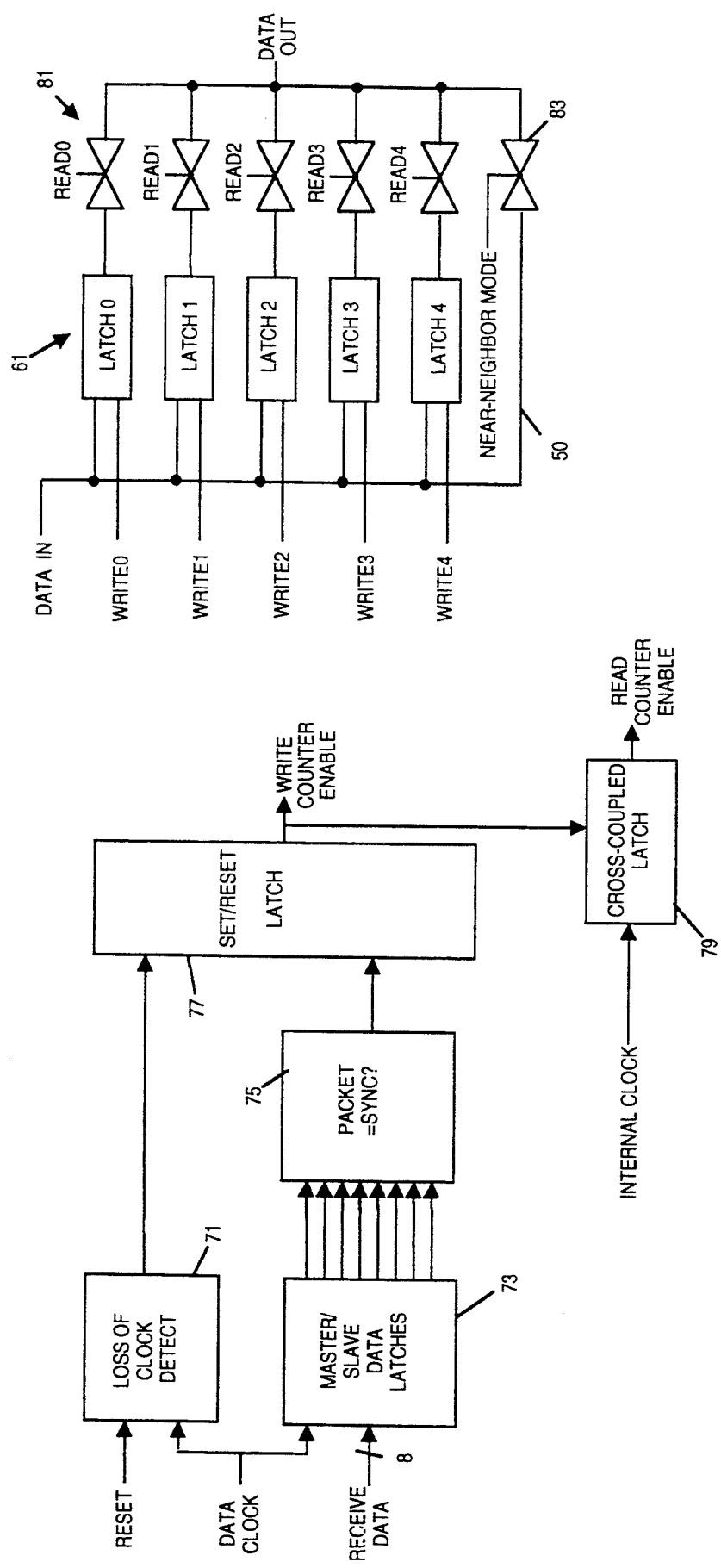

SELF-SYNCHRONIZING DATA QUEUES

FIELD OF THE INVENTION

The invention is in the field of computer systems which utilize high speed multi-processors which communicate with each other across backplane and cabinet boundaries and describes a technique to resolve synchronization problems caused by propagation and other delays inherent in such an environment.

BACKGROUND OF THE INVENTION

High speed multi-processor systems depend on high-speed communication between individual processor cells within an array of cells. In a typical design, each processor cell is comprised of a central processing unit and its associated local memory, and communicates with four of its neighbors over high speed (e.g., 40 Mbyte/sec) data channels.

Pathways of processor cells in close electrical proximity (those communicating with cells located on the same printed-circuit board or on the same backplane) communicate in what is referred to near-neighbor mode; data is generated in the transmitting cell, propagated over printed circuit board traces, is accepted by the receiving cell, and is utilized by the receiving cell immediately after its reception. This simple communication method is possible because the sum of clock skew (i.e., misalignment of clock edges arriving at different cells), data transmission delay, and setup time is less than the period of the system clock. In short, nothing special need be done to the data because it arrives soon enough to be used immediately.

When cells must communicate across backplane or cabinet boundaries, data is typically transmitted differentially over cables. This introduces propagation delays caused by the differential transceivers used to drive the cable and by the speed-of-light delay of the cable itself. This creates two design problems. First, the addition of the transceiver propagation delay and the cable propagation delay make the transmitted data arrive at the receiver too late to be immediately used. Second, different systems may use different combinations of backplanes, cables, and cabinets. Neither the system software nor system hardware is aware of the physical configuration of the system, and so neither can compensate for these additional delays.

Much of the recent work in data synchronization has been done in token-ring systems. These are usually fully asynchronous systems (the clocks in different units can differ in both frequency and phase) that use bit-serial communication. Because the operating frequency of transmitter and receiver can be different, these systems must constantly re-synchronize the bit streams they are exchanging. This, of course, comes at the expense of the maximum communication bandwidth of the system.

One such prior art system uses what is known as an ATT T1 PCM transceiver which is an interface supporting bit-serial digital communication over T1 phone lines. It uses an elastic buffer (essentially a First-In-First-Out (FIFO) buffer) whose depth grows and shrinks to accommodate the differing timing relationship of the transmitting and receiving systems. In this transceiver, the framing sync (synchronizing the start of long packets of information) is accomplished in firmware by using an internal microprogrammed microprocessor. Bit sync (synchronizing individual bits in a bit stream once framing sync has been established) is accomplished by hardware in the receiver. This system is flexible and easily changed, but it consumes a good deal of silicon area, is overkill for simple systems (like the phase-asynchronous system of the present invention), and requires that some of the ring data bandwidth be taken up by the transmission of re-synchronizing START bits.

Another prior art system is the IBM Token-Ring adapter which is similar in function to the ATT T1 PCM transceiver. In the IBM system, however, the synchronization occurs in the transmitter. A microprogrammed microprocessor implements an elastic buffer in firmware. This system shares the advantages and disadvantages of the ATT T1 PCM transceiver.

A third system is an interface in a system known as a Cambridge Fast Ring which is comprised of an Emitter Coupled-Logic (ECL) repeater chip and a CMOS control-logic chip. Synchronization is implemented in hardware on the CMOS chip, and is part of the transmitter. Because this approach uses dedicated hardware rather than the microprocessor used in the above examples, it is particularly suited for use in systems using crowded microprocessor chips. However, it shares with the other prior art systems a need to receive a START bit periodically to resynchronize. In addition, it is also a bit-serial approach, as opposed to the parallel approach of the present invention.

BRIEF SUMMARY OF THE INVENTION

A system is disclosed which enables processor cells in a high speed multi-processor environment to communicate with each other so as to resolve synchronization problems caused by propagation and other delays inherent in such an environment.

Like the fully asynchronous token-ring prior art systems described above, the data delay between cells in a system according to the present invention is unknown a priori. Unlike the token-ring systems, however, the data delay in the present system is both bounded and fixed. Because pathways of the invented system communicate only within the environment of the invented system, the maximum data delay is part of the system specifications. This fact, along with the fact that all cells are operating at the same frequency, allows for a synchronization scheme called far-neighbor mode. In this mode, data is transmitted along with a clock to allow the receiving cell to properly recover the data regardless of the state of the receiver's internal clocks. Both the transmitting cell and the receiving cell are operating at the same frequency (because their clock signals are derived from the same master oscillator), but the range of delays associated with the transmission of data places no bounds on the allowable phase difference between the received data's clock and the receiver's internal clock state. The communication, then, is phase-asynchronous.

BRIEF DESCRIPTION OF THE DRAWINGS

FIG. 3a is a timing diagram showing the assembly of a data word in near-neighbor mode.

FIG. 3b is a timing diagram showing the assembly of a data word in far-neighbor mode.

FIG. 6 is a block diagram of sync detect 45.

FIG. 7 is a block diagram of FIFO 61.

DETAILED DESCRIPTION OF THE INVENTION

Figure 1:
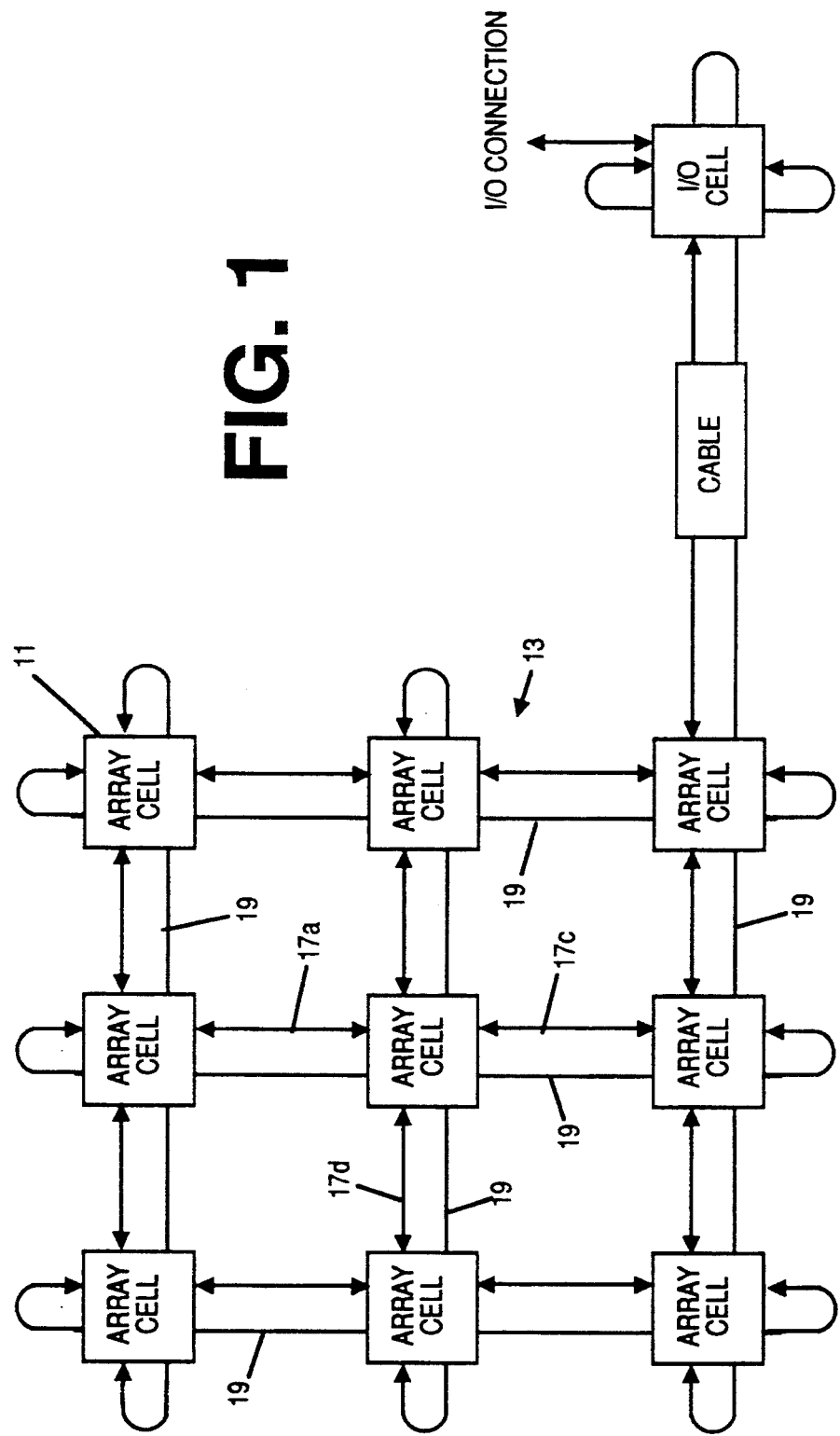
FIG. 1 is a block overview diagram of a multiprocessor cell arrangement according to the present invention.

High speed multiprocessing systems depend on high-speed communication between individual processor cells 11 in an array of cells 13 as shown in FIG. 1. In a typical design, each processor cell is comprised of a central processing unit and its associated local memory, and communicates with four of its neighbors over eight high speed (e.g., 40 Mbyte/sec) unidirectional data channels 17a–17d (four input and four output). Also shown in FIG. 1 are loopback lines 19 which are coupled to the cells at each end of a row and at each end of a column and are used so that all cells in an array are identical without regard to their position. Each input/output channel pair is called a physical pathway. In a preferred embodiment, pathways pass a complete word as four thirteen-bit packets, one transmitted each system-clock period.

Figure 2:
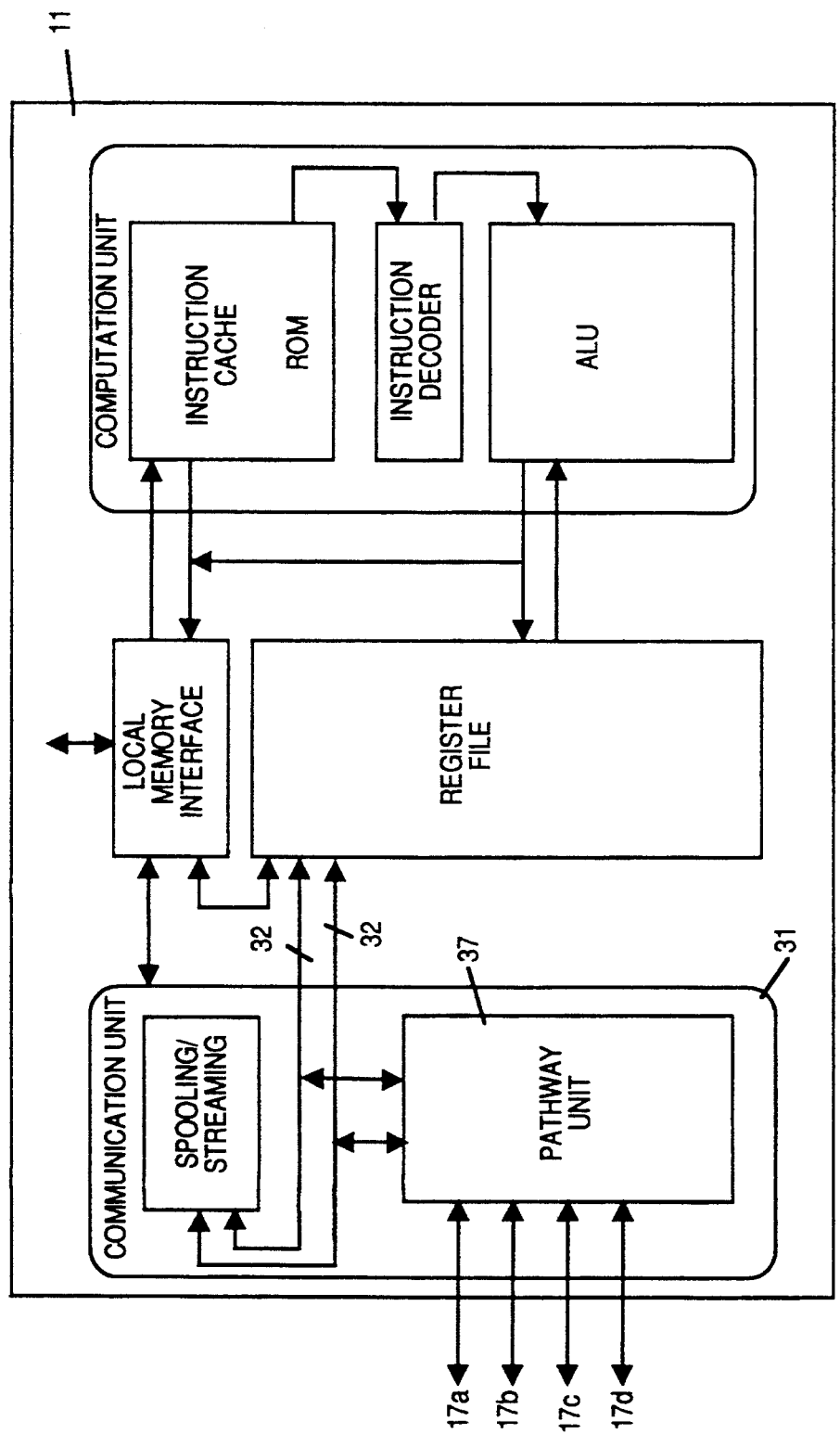
FIG. 2 is a block diagram of a single processor cell.

A single array cell 11 is shown in FIG. 2 wherein the circuitry which forms the present invention is part of the cell's communication unit 31. This circuitry is referred to as the pathway unit 37 whose inputs and outputs are the data channels 17a–17d. The remaining elements in the cell are typical processor elements such as a register file, ALU, ROM, instruction decoder and the like.

Pathways of processor cells in close electrical proximity (those communicating with cells located on the same printed-circuit board or on the same backplane) communicate in what is referred to as near-neighbor mode; data is generated in the transmitting cell, propagated over printed circuit board traces, is accepted by the receiving cell, and is utilized by the receiving cell immediately after its reception.

In far neighbor mode, i.e., when cells must communicate across backplane or cabinet boundaries, data is transmitted differentially over cables. This introduces propagation delays caused by the differential transceivers used to drive the cable and by the speed-of-light delay of the cable itself.

The introduced propagation delays create a synchronization problem which the pathway units of the invention solve by providing self-synchronizing FIFO's for data incoming to each cell. In this manner, cells which are in close electrical proximity can communicate in near-neighbor mode, where both the clock skew and data delay between the microprocessors are small enough that transmitted data can be used in the same internal clock phase in which it is received, or in far neighbor mode where it is necessary to account for the propagation delay. FIG. 3a shows data packets in near-neighbor mode being transmitted, received after a short delay, and used internally as soon as the last packet of a word has been received. FIG. 3b shows data packets in far neighbor mode being transmitted, received after a relatively long delay, and used internally as soon as the last packet of a word has been received.

Figure 4:
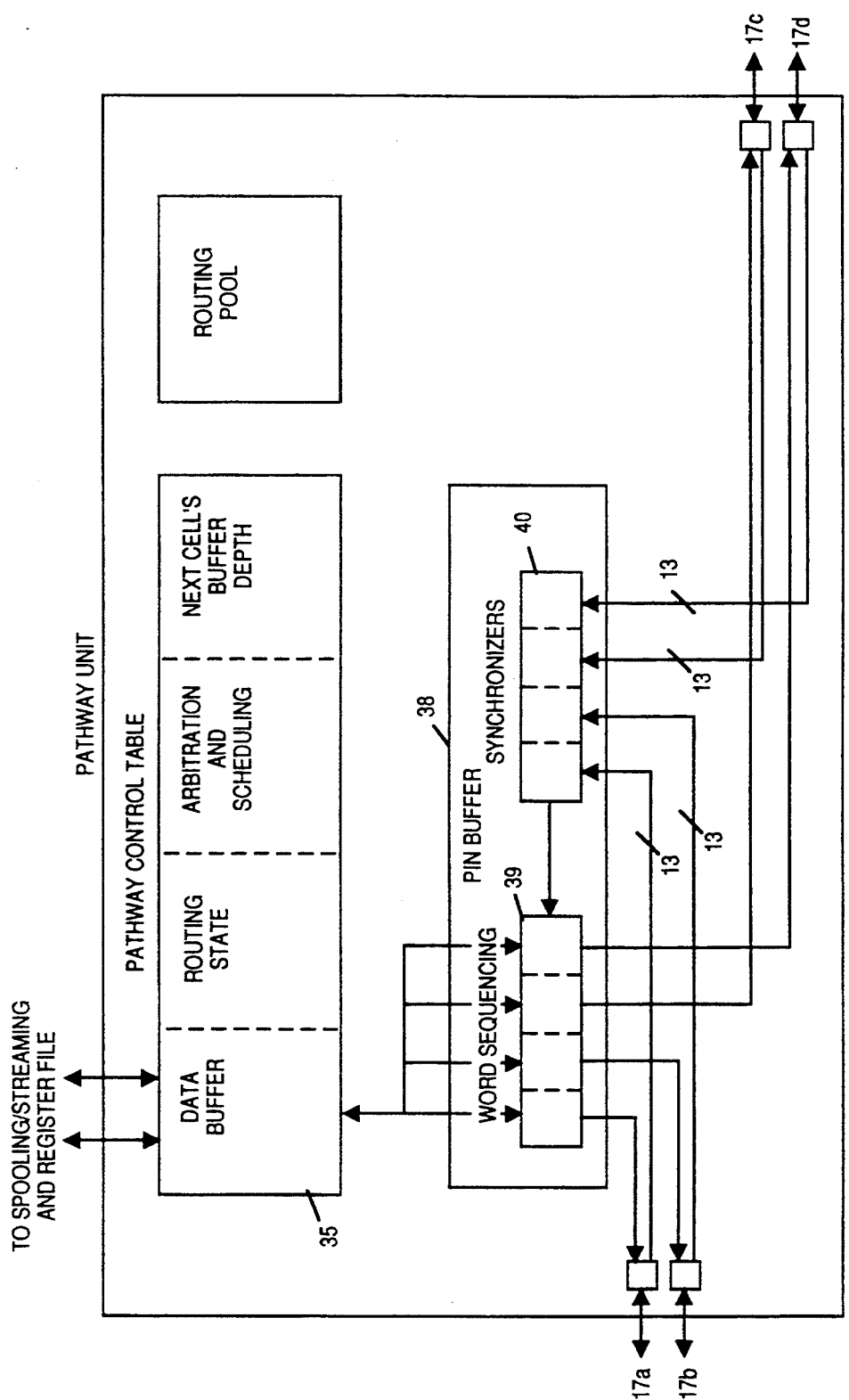
FIG. 4 is a block diagram of a pathway unit of a cell.

Referring to FIG. 4, a pathway unit 37 comprises a pathway control table including a data buffer 35 and a pin buffer 38 having word sequencing circuitry 39 and synchronizers 40. The remaining elements of the pathway control table, namely routing state, arbitration and scheduling, next cell's buffer depth and routing pool are shogun for completeness, but do not form part of the present invention and, therefore, will not be described herein. Additionally, this description assumes a system in which the processor cells have a 32 bit internal architecture with each pathway having 8 dedicated pins thereby requiring four clocks to transmit a complete 32 bit word in groups of 8 bits per clock. The description also assumes that each 8 bit group has 5 bits for parity and control and a single bit for a data clock. Of course, other configurations are possible without departing from the invention.

In near-neighbor mode, a fully-assembled data word is available to data buffer 35 within a pathway unit 37 the phase after the word's fourth packet is received as shown in FIG. 3a. Thus, no special attention need be paid to synchronizing this data. The clock skews and data delays encountered when passing data between card cages or system cabinets, however, makes this sort of communication impossible at the frequency used by a fast system clock, e.g., greater than 12 MHz. For this reason, microprocessor cells in the present invention transmit data with a clock signal, and both pass through the same transmission path. The data is then recovered and synchronized by the receiving cell as described in detail below.

As noted above, FIG. 3b shows data packets in far-neighbor mode being received after a relatively long transmit propagation delay, and the assembled data word waiting to be used by the receiving cell. Both the data propagation delay and the clock skew are unknown in the general case; data can be delayed by from one to four system clock periods without affecting bus utilization, and the system specifications place no constraints on the allowable phase shift between microprocessor clocks on different backplanes. In fact, the transmission-line nature of intercell connections allows an arbitrary amount of data to be staged on a properly terminated cable, limited only by the length of the cable.

When a communication pathway is operating in far-neighbor mode, the received data needs to be synchronized with the clock state of the receiving cell 11 because the incoming data packets are not being received in the proper clock phase to be utilized by the receiving cell. Data synchronization could be implemented in either the transmitter (by delaying output data to match the system delay) or in the receiver (by staging input data, holding it until it is required). However, because the cells of the present invention do not acknowledge receipt of data packets, communication resources would have had to be sacrificed to implement the feedback required to place the synchronizer in the transmitter. Placing the synchronizer in the receiver, however, allows data delay to be measured and acted upon locally in the receiving cell. Referring to FIG. 4, this task is accomplished by the data synchronizers 40 (one per data channel) of the pathway unit 37. The synchronizers are part of a pin buffer 38 which also includes word sequencing circuitry 39 (one per data channel) which takes parallel data from data buffer 35, adds parity and control and places the data, parity and control onto one of the four data channels 17a–17d. In particular, for a system using cells with a 32 bit internal architecture, when a cell is transmitting data, a 32 bit data word is stored in data buffer 35 which passes the word to the word sequencing circuitry 39 for transmission during the course of four system clocks, there being 8 data bits per clock for a system dedicating 8 pins per pathway. The word sequencing circuitry, although not necessary for operation of the invention, adds to each of the 8 data bits parity and control signals as may be dictated by system requirements, and a clock. Thus, for a system having 5 control and parity bits in addition to the data bits, a total of 14 lines are used (13 data and 1 clock).

Figure 5:
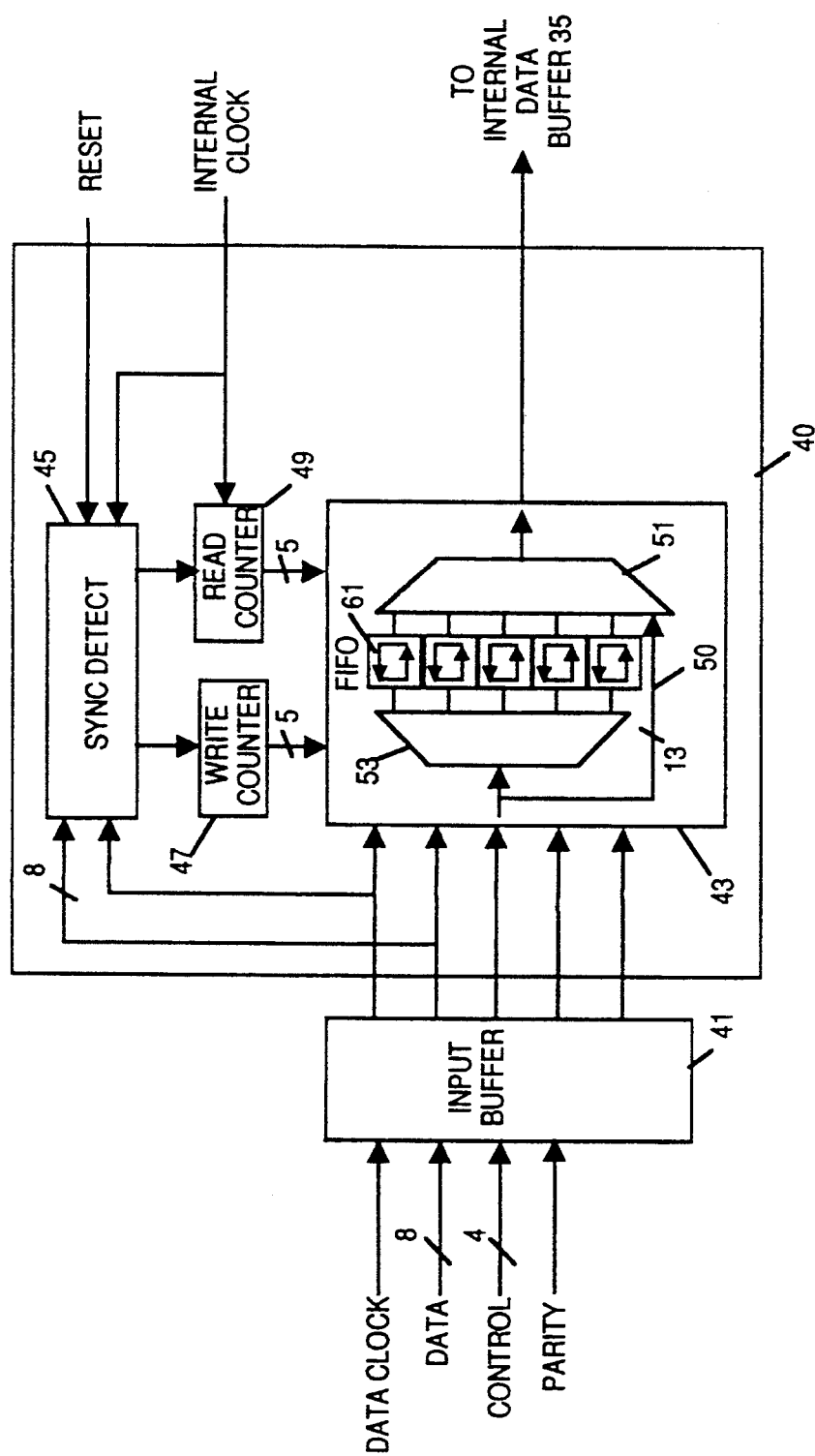
FIG. 5 is a block diagram of a data synchronizer.

Data entering one of the microprocessor's communication unit's 31 four communication pathways 17a–17d passes first through a corresponding variable-threshold input buffer 41 then into the appropriate 1 of 4 data synchronizers 40. The details of a single data synchronizer is shown in FIG. 5 with an input buffer 41 and includes sync detect circuitry 45, write counter 47, read counter 49 and FIFO 43. When a pathway is operating in near-neighbor mode the data bypasses the synchronizing logic over line 50 directly into multiplexor 51 and feeds the data buffer 35 for the pathway unit 37 of the communication unit 31. In this connection, the pathway is assumed to be operating in far-neighbor mode unless the program being executed by the cell issues an instruction to reconfigure the pathway to operate in near-neighbor mode. When a pathway is operating in far-neighbor mode, the incoming data packets generally are not received in the proper clock phase to be utilized by the receiving cell 11. They are, therefore, staged in variable-length FIFO 43 and read out when they are required. Since the combination of clock skew and data propagation delay are unknown, the length of the FIFO must be adjusted to match the received data.

To facilitate synchronization, a pathway transmits synchronization (SYNC) words after leaving the RESET state and whenever no other data is being transmitted over the pathway. In this connection, a RESET occurs when a reset pin on the cell is asserted such as during an initial power-up or by user intervention. Since a check for synchronization is made only after leaving the RESET state, the SYNC words may be any relatively unique pattern, notwithstanding that it is possible that the same pattern could appear as part of normal data. A suitable SYNC word sequence is a four packet group containing $555555AA_{16}$ or other pattern such that the SYNC word contains a data value in the first transmitted packet which differs from those in the other three packets.

Each synchronizer 40, upon leaving RESET, waits for the arrival of the first packet of the SYNC word. When this word has arrived, the receiver's FIFO 43 begins to fill. Data packets are read out of the FIFO by the signals Read0, Read1, Read2 and Read3, Read400 as shown in FIG. 7 and described below and into the communication unit's data buffer 35 based on the internal clock state of the receiving cell, synchronizing the data. Each data synchronizer (see FIG. 5) includes the FIFO 43, sync detect 45, write counter 47 and read counter 49. The FIFO is implemented as a five-deep circular buffer of edge-triggered flip-flops or master-slave latches 61 which are clocked as a function of the received data clock and the state of the write counter 47 with the write counter serving as a write pointer into the circular buffer, sequentially directing data into FIFO 43. FIFO 43 is shown in FIG. 5 as also including read multiplexor 51 and demultiplexor latches 61; data is clocked into the appropriate latch based on the state of write counter 47. Once the sync detect circuitry 45 enters the In-Sync state, successively-received data is written into successive latches Latch 0, Latch 1, Latch 2, Latch 3, Latch 4 as one of Write0, Write1, Write2, Write3 and Write4 are asserted in succession. One of the five latch outputs 61 is selected by the state of the read counter 49 as one of Read0, Read1, Read2, Read3 and Read4 are asserted in succession causing the data to be passed by transmission gates 81 to input buffer 35. Of course, if the cell has been programmed to run in near-neighbor mode, Latch0–Latch4 are bypassed and the incoming data is passed directly to transmission gate 83 for transfer to input buffer 35.

The write counter 47 and read counter 49 are both three-bit-five-state synchronous counters implemented using transparent latches in a master-slave configuration. A cross-coupled latch 79 generates the required non-overlapping clocks. This latch, which has as its inputs the internal clock of the cell and write counter Enable, ensures that read counter 49 does not start during the same internal clock state in which write counter 47 starts. The maximum delay added by this latch is one complete word time, which for 32 bit words taken 8 bits at a time is four clocks. The write counter 47 is held in a COUNT=0 state until the sync detect circuitry 45 enters the In-Sync state (when synchronization is acquired). The read counter 49 is held in the COUNT=0 state until the clock state of the receiver is correct for the acceptance of the first data packet of a data word after the acquisition of the received pin data into an edge-triggered latch 73), looking for the packet containing the SYNC pattern. This packet indicates the start of a transmitted word. The sync detect circuitry, as shown in FIG. 6, includes loss of clock detect logic 71, master/slave data latches 73 and packet=sync? logic 75, which detect whether the latched data packet matches the SYNC pattern, changes the state of a clocked set/reset latch 77 and puts the sync detect circuitry 45 in the In-Sync state and Write Counter Enable is asserted. Loss of clock detect logic 71 determines whether data is being received by checking for the presence of the data clock so long as the internal clock signal is present. This logic may be implemented by ensuring that there is at least one receive clock after every four internal clocks. Four internal clocks are used since that ensures that an error situation is detected before a complete 32 bit word has been assembled. Systems having different length words would utilize a different number of internal clocks. The sync detect circuitry remains in the In-Sync state unless the processor again enters the RESET state or unless the sync detect circuitry determines that the received data clock (which would be constantly running under normal conditions) has stopped. In either of these cases, the sync detect circuitry re-enters the Not-In-Sync state, stops passing received data to the rest of the pathway unit 37, and waits for the re-acquisition of synchronization.

As shown in FIG. 7, data from the input pins from one of data channels 17a–17d is presented to the inputs of all five latches 61; data is clocked into the appropriate latch based on the state of write counter 47. Once the sync detect circuitry 45 enters the In-Sync state, successively-received data is written into successive latches Latch 0, Latch 1, Latch 2, Latch 3, Latch 4 as one of Write0, Write1, Write2, Write3 and Write4 are asserted in succession. One of the five latch outputs 61 is selected by the state of the read counter 49 as one of Read0, Read1, Read2, Read3 and Read4 are asserted in succession causing the data to be passed by transmission gates 81 to input buffer 35. Of course, if the cell has been programmed to run in near-neighbor mode, Latch0–Latch4 are bypassed and the incoming data is passed directly to transmission gate 83 for transfer to input buffer 35.

The write counter 47 and read counter 49 are both three-bit-five-state synchronous counters implemented using transparent latches in a master-slave configuration. A cross-coupled latch 79 generates the required non-overlapping clocks. This latch, which has as its inputs the internal clock of the cell and write counter Enable, ensures that read counter 49 does not start during the same internal clock state in which write counter 47 starts. The maximum delay added by this latch is one complete word time, which for 32 bit words taken 8 bits at a time is four clocks. The write counter 47 is held in a COUNT=0 state until the sync detect circuitry 45 enters the In-Sync state (when synchronization is acquired). The read counter 49 is held in the COUNT=0 state until the clock state of the receiver is correct for the acceptance of the first data packet of a data word after the acquisition of synchronization. For this purpose, the clock generator of the processor defines four clock states, one of which indicates the first packet of a data word.

I claim:

1. A multiprocessor system comprising:
a plurality of processing cells, each of said cells coupled to a plurality of data pathways for communicating with adjacent cells, wherein a first predetermined number of said adjacent cells are disposed on a single printed circuit board and a second predetermined number of said adjacent cells are disposed on a printed circuit board coupled to a remote backplane, wherein each of said cells is adapted to exchange data on said data pathways with said first predetermined number of said adjacent cells in a near-neighbor mode and with said second predetermined number of said adjacent cells in a far-neighbor mode.

2. The system defined by claim 1 wherein each of said cells includes a pathway unit coupled to said plurality of data pathways, said pathway unit comprising:
a) input buffer means coupled to said plurality of data pathways for storing received data and an associated data clock;
b) a plurality of data synchronizer means coupled to said input buffer corresponding to each of said plurality of data pathways, said data synchronizer means for synchronizing said received data with an internal processor clock prior to processing by said processor cell;
c) data buffer means coupled to said plurality of data synchronizer means for storing said synchronized data and data to be transmitted over said data pathways.

3. The system defined by claim 2 wherein each of said data synchronizer means comprises:
a) a FIFO coupled to said input buffer means for latching said data when said cell is operating in far neighbor mode;
b) sync detect means coupled to said input buffer and adapted to receive as input, said data clock, said data, a RESET signal and said internal clock, said sync detect means for checking for the presence of said data clock and for a Sync word after said RESET signal has been asserted and generating Write Counter Enable and Read Counter Enable signals;
c) write counter means coupled to said sync detect means and said FIFO for generating a plurality of write signals which enable said FIFO to store data from said input buffer in one of a plurality of latches corresponding to said plurality of write signals;
d) read counter means coupled to said sync detect means and said FIFO for generating a plurality of read signals which cause said FIFO to release data from a predetermined one of said plurality of latches corresponding to said plurality of read signals.

4. The system defined by claim 3 wherein said sync detect means comprises:
a) loss of clock detect logic coupled to said input buffer and having as its inputs said data clock, said internal clock and said RESET signal and generating a logic true output when said RESET signal is asserted or when there are no data clocks after a predetermined number of internal clocks;
b) master/slave data latches coupled to said input buffer means and having as its inputs said data clock and said data from said input buffer means;
c) packet=sync? logic coupled to said master/slave data latches for comparing data in said master/slave data latches to a predetermined sync word;
d) a set/reset latch coupled to said packet=sync? logic and said loss of clock detect logic for asserting said Write Counter Enable signal when said packet=sync? logic determines that said predetermined sync word has been matched and said data clock is being received;
e) a cross-coupled latch coupled to said set/reset latch and generating said Read Counter Enable signal which is delayed by said cross-coupled latch with respect to said Write Counter Enable signal to ensure that said Read Counter Enable and Write Counter Enable signals do not commence during the same internal clock state.

5. The system defined by claim 3 wherein said FIFO comprises;
a) a plurality of latches coupled to said data buffer and said write counter means and adapted to latch data from said data buffer based upon the state of said write counter means;
b) a plurality of transmission gates coupled to said plurality of latches and said read counter means and adapted to transmit data from said latches based upon the state of said read counter means.

6. The system defined by claim 5 wherein said FIFO further comprises a transmission gate coupled to said input buffer and adapted to transmit said data from said input buffer when said cell is programmed to operate in near neighbor mode.

7. The system defined by claim 3 wherein said read counter means comprises a three bit five state synchronous counter.

8. A multiprocessor system comprising:
a plurality of processing cells, each of said cells coupled to a plurality of data pathways for communicating with adjacent cells, wherein a first predetermined number of said adjacent cells are disposed on a printed circuit board coupled to a common backplane and a second predetermined number of said adjacent cells are disposed on a printed circuit board coupled to a remote backplane, wherein each of said cells is adapted to exchange data on said data pathways with said first predetermined number of said adjacent cells in a near-neighbor mode and with said second predetermined number of said adjacent cells in a far-neighbor mode.

9. The system defined in claim 8 wherein each of said cells includes a pathway unit coupled to said plurality of data pathways, said pathway unit comprising:

a) input buffer means coupled to said plurality of data pathways for storing received data and an associated data clock;
b) a plurality of data synchronizer means coupled to said input buffer corresponding to each of said plurality of data pathways, said data synchronizer means for synchronizing said received data with an internal processor clock prior to processing by said processor cell;
c) data buffer means coupled to said plurality of data synchronizer means for storing said synchronized data and data to be transmitted over said data pathways.

10. The system defined by claim 9 wherein each of said data synchronizer means comprises:
   a) a FIFO coupled to said input buffer means for latching said data when said cell is operating in far-neighbor mode;
   b) sync detect means coupled to said input buffer and adapted to receive as input, said data clock, said data, a RESET signal and said internal clock, said sync detect means for checking for the presence of said data clock and for a sync word after said RESET signal has been asserted and generating Write Counter Enable and Read Counter Enable signals;
   c) write counter means coupled to said sync detect means and said FIFO for generating a plurality of write signals which enable said FIFO to store data from said input buffer in one of a plurality of latches corresponding to said plurality of write signals;
   d) read counter means coupled to said sync detect means and said FIFO for generating a plurality of read signals which cause said FIFO to release data from a predetermined one of said plurality of latches corresponding to said plurality of read signals.

11. The system defined by claim 10 wherein said sync detect means comprises:
   a) loss of clock detect logic coupled to said input buffer and having as its inputs said data clock, said internal clock and said RESET signal and generating a logic true output when said RESET signal is asserted or when there are no data clocks after a predetermined number of internal clocks;
   b) master/slave data latches coupled to said input buffer means and having as its inputs said data clock and said data from said input buffer means;
   c) packet=sync? logic coupled to said master/slave data latches for comparing data in said master/slave data latches to a predetermined sync word;
   d) a set/reset latch coupled to said packet=? logic and said loss of clock detect logic for asserting said Write Counter Enable signal when said packet=? logic determines that said predetermined sync word has been matched and said data clock is being received;
   e) a cross-coupled latch coupled to said set/reset latch and generating said Read Counter Enable signal which is delayed by said cross-coupled latch with respect to said Write Counter Enable signal to ensure that said Read Counter Enable and Write Counter Enable signals do not commence during the same internal clock state.

12. The system defined by claim 10 wherein said FIFO comprises:
   a) a plurality of latches coupled to said data buffer and said write counter means and adapted to latch data from said data buffer based upon the state of said write counter means;
   b) a plurality of transmission gates coupled to said plurality of latches and said read counter means and adapted to transmit data from said latches based upon the state of said read counter means.

13. The system defined by claim 12 wherein said FIFO further comprises a transmission gate coupled to said input buffer and adapted to transmit said data from said input buffer when said cell is programmed to operate in near-neighbor mode.

14. The system defined by claim 10 wherein said read counter means comprises a three bit five state synchronous counter.

* * * * *

UNITED STATES PATENT AND TRADEMARK OFFICE
CERTIFICATE OF CORRECTION

PATENT NO. : 5,355,504
DATED : October 11, 1994
INVENTOR(S) : david J. Nedwek

It is certified that error appears in the above-indentified patent and that said Letters Patent is hereby corrected as shown below:

Column 10, line 11, After "=" Insert --sync--
Column 10, line 13, After "=" Insert --sync--

Signed and Sealed this

Twenty-sixth Day of September, 1995

Attest:

BRUCE LEHMAN

*Attesting Officer*        *Commissioner of Patents and Trademarks*